US010766595B2

(12) United States Patent
Stockett et al.

(10) Patent No.: US 10,766,595 B2
(45) Date of Patent: Sep. 8, 2020

(54) COMPOSITE VEHICLE BODY

(71) Applicant: CC3D LLC, Coeur d'Alene, ID (US)

(72) Inventors: Ryan C Stockett, Lebanon, NH (US); Kenneth L. Tyler, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 546 days.

(21) Appl. No.: 15/682,844

(22) Filed: Aug. 22, 2017

(65) Prior Publication Data

US 2018/0118326 A1     May 3, 2018

Related U.S. Application Data

(60) Provisional application No. 62/417,056, filed on Nov. 3, 2016.

(51) Int. Cl.
*B64C 1/12*        (2006.01)
*B29C 64/336*     (2017.01)
(Continued)

(52) U.S. Cl.
CPC .............. *B64C 1/12* (2013.01); *B29C 64/106* (2017.08); *B29C 64/118* (2017.08); *B29C 64/165* (2017.08); *B29C 64/209* (2017.08); *B29C 64/336* (2017.08); *B29C 70/30* (2013.01); *B29C 70/382* (2013.01); *B29C 70/56* (2013.01);
(Continued)

(58) Field of Classification Search
CPC ..... Y10T 428/24992; Y10T 428/24083; Y10T 428/24124; B32B 2605/18; B33Y 80/00; B33Y 30/00; B33Y 10/00; B64C 1/08; B64C 3/52; B64C 2001/0072; B29L 2031/3085; B29L 2031/3076; B29C 70/56; B29C 70/382
See application file for complete search history.

(56) References Cited

U.S. PATENT DOCUMENTS 3,286,305 A    11/1966   Seckel
3,809,514 A     5/1974   Nunez
(Continued)

FOREIGN PATENT DOCUMENTS

DE           4102257 A1    7/1992
EP            2589481 B1    1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Philip J Bonzell
*Assistant Examiner* — Michael B. Kreiner
(74) *Attorney, Agent, or Firm* — Ryan C. Stockett

(57) ABSTRACT

A vehicle body may have an internal skeleton forming a wing shape and a fuselage shape, and a skin fabricated in-situ over the internal skeleton. The skin may include a matrix material, and a plurality of continuous fibers at least partially coated with the matrix material. The plurality of continuous fibers may extend from the wing shape over the fuselage shape.

19 Claims, 8 Drawing Sheets

(51) Int. Cl.

| | | |
|---|---|---|
| *B29C 70/38* | (2006.01) | |
| *B29C 64/106* | (2017.01) | |
| *B64C 1/06* | (2006.01) | |
| *B64C 3/34* | (2006.01) | |
| *B64C 1/08* | (2006.01) | |
| *B29C 70/56* | (2006.01) | |
| *B29D 99/00* | (2010.01) | |
| *B32B 5/02* | (2006.01) | |
| *B64C 3/26* | (2006.01) | |
| *B33Y 80/00* | (2015.01) | |
| *B64C 1/26* | (2006.01) | |
| *B64F 5/10* | (2017.01) | |
| *B29C 70/30* | (2006.01) | |
| *B64C 3/18* | (2006.01) | |
| *B64C 3/20* | (2006.01) | |
| *B33Y 10/00* | (2015.01) | |
| *B33Y 30/00* | (2015.01) | |
| *B29C 64/118* | (2017.01) | |
| *B29C 64/209* | (2017.01) | |
| *B29C 64/165* | (2017.01) | |
| *B29L 31/30* | (2006.01) | |
| *B29K 101/10* | (2006.01) | |
| *B62D 29/04* | (2006.01) | |
| *B64C 1/00* | (2006.01) | |

(52) U.S. Cl.
CPC .............. *B29D 99/001* (2013.01); *B32B 5/02* (2013.01); *B33Y 10/00* (2014.12); *B33Y 30/00* (2014.12); *B33Y 80/00* (2014.12); *B64C 1/06* (2013.01); *B64C 1/061* (2013.01); *B64C 1/08* (2013.01); *B64C 1/26* (2013.01); *B64C 3/18* (2013.01); *B64C 3/20* (2013.01); *B64C 3/26* (2013.01); *B64C 3/34* (2013.01); *B64F 5/10* (2017.01); *B29K 2101/10* (2013.01); *B29L 2031/30* (2013.01); *B29L 2031/3076* (2013.01); *B29L 2031/3085* (2013.01); *B32B 2307/50* (2013.01); *B32B 2605/18* (2013.01); *B62D 29/043* (2013.01); *B64C 3/182* (2013.01); *B64C 3/185* (2013.01); *B64C 3/187* (2013.01); *B64C 2001/0072* (2013.01)

(56) References Cited

U.S. PATENT DOCUMENTS

| | | | |
|---|---|---|---|
| 3,984,271 A | | 10/1976 | Gilbu |
| 3,993,726 A | | 11/1976 | Moyer |
| 4,643,940 A | | 2/1987 | Shaw et al. |
| 4,671,761 A | | 6/1987 | Adrian et al. |
| 4,822,548 A | | 4/1989 | Hempel |
| 4,838,346 A | * | 6/1989 | Camarda ............. F28D 15/0233 165/104.14 |
| 4,851,065 A | | 7/1989 | Curtz |
| 5,002,712 A | | 3/1991 | Goldmann et al. |
| 5,037,691 A | | 8/1991 | Medney et al. |
| 5,296,335 A | | 3/1994 | Thomas et al. |
| 5,340,433 A | | 8/1994 | Crump |
| 5,440,193 A | | 8/1995 | Barrett |
| 5,746,967 A | | 5/1998 | Hoy et al. |
| 5,866,058 A | | 2/1999 | Batchelder et al. |
| 5,936,861 A | | 8/1999 | Jang et al. |
| 6,153,034 A | | 11/2000 | Lipsker |
| 6,459,069 B1 | | 10/2002 | Rabinovich |
| 6,501,554 B1 | | 12/2002 | Hackney et al. |
| 6,799,081 B1 | | 9/2004 | Hale et al. |
| 6,803,003 B2 | | 10/2004 | Rigali et al. |
| 6,934,600 B2 | | 8/2005 | Jang et al. |
| 7,039,485 B2 | | 5/2006 | Engelbart et al. |
| 7,093,638 B2 | * | 8/2006 | Bonaventura ............ B29C 70/28 156/351 |
| 7,555,404 B2 | | 6/2009 | Brennan et al. |
| 7,795,349 B2 | | 9/2010 | Bredt et al. |
| 8,221,669 B2 | | 7/2012 | Batchelder et al. |
| 8,322,656 B2 | * | 12/2012 | Pahl ........................ B64C 3/22 244/119 |
| 8,962,717 B2 | | 2/2015 | Roth et al. |
| 9,126,365 B1 | | 9/2015 | Mark et al. |
| 9,126,367 B1 | | 9/2015 | Mark et al. |
| 9,149,988 B2 | | 10/2015 | Mark et al. |
| 9,156,205 B2 | | 10/2015 | Mark et al. |
| 9,186,846 B1 | | 11/2015 | Mark et al. |
| 9,186,848 B2 | | 11/2015 | Mark et al. |
| 9,327,452 B2 | | 5/2016 | Mark et al. |
| 9,327,453 B2 | | 5/2016 | Mark et al. |
| 9,370,896 B2 | | 6/2016 | Mark |
| 9,381,702 B2 | | 7/2016 | Hollander |
| 9,457,521 B2 | | 10/2016 | Johnston et al. |
| 9,458,955 B2 | | 10/2016 | Hammer et al. |
| 9,527,248 B2 | | 12/2016 | Hollander |
| 9,539,762 B2 | | 1/2017 | Durand et al. |
| 9,579,851 B2 | | 2/2017 | Mark et al. |
| 9,688,028 B2 | | 6/2017 | Mark et al. |
| 9,694,544 B2 | | 7/2017 | Mark et al. |
| 9,764,378 B2 | | 9/2017 | Peters et al. |
| 9,770,876 B2 | | 9/2017 | Farmer et al. |
| 9,782,926 B2 | | 10/2017 | Witzel et al. |
| 9,981,421 B2 | * | 5/2018 | Marcoe ............... B29C 61/0625 |
| 10,076,876 B2 | * | 9/2018 | Mark .................... B29C 64/118 |
| 2002/0009935 A1 | | 1/2002 | Hsiao et al. |
| 2002/0062909 A1 | | 5/2002 | Jang et al. |
| 2002/0113331 A1 | | 8/2002 | Zhang et al. |
| 2002/0165304 A1 | | 11/2002 | Mulligan et al. |
| 2003/0044539 A1 | | 3/2003 | Oswald |
| 2003/0056870 A1 | | 3/2003 | Comb et al. |
| 2003/0160970 A1 | | 8/2003 | Basu et al. |
| 2003/0186042 A1 | | 10/2003 | Dunlap et al. |
| 2003/0236588 A1 | | 12/2003 | Jang et al. |
| 2005/0006803 A1 | | 1/2005 | Owens |
| 2005/0061422 A1 | | 3/2005 | Martin |
| 2005/0104257 A1 | | 5/2005 | Gu et al. |
| 2005/0109451 A1 | | 5/2005 | Hauber et al. |
| 2005/0230029 A1 | | 10/2005 | Vaidyanathan et al. |
| 2007/0003650 A1 | | 1/2007 | Schroeder |
| 2007/0228592 A1 | | 10/2007 | Dunn et al. |
| 2008/0176092 A1 | | 7/2008 | Owens |
| 2009/0095410 A1 | | 4/2009 | Oldani |
| 2010/0319838 A1 | | 12/2010 | Booher |
| 2011/0032301 A1 | | 2/2011 | Fienup et al. |
| 2011/0143108 A1 | | 6/2011 | Fruth et al. |
| 2012/0060468 A1 | | 3/2012 | Dushku et al. |
| 2012/0159785 A1 | | 6/2012 | Pyles et al. |
| 2012/0164907 A1 | | 6/2012 | Restuccia et al. |
| 2012/0231225 A1 | | 9/2012 | Mikulak et al. |
| 2012/0247655 A1 | | 10/2012 | Erb et al. |
| 2013/0149521 A1 | | 6/2013 | Nelson et al. |
| 2013/0164498 A1 | | 6/2013 | Langone et al. |
| 2013/0209600 A1 | | 8/2013 | Tow |
| 2013/0233471 A1 | | 9/2013 | Kappesser et al. |
| 2013/0292039 A1 | | 11/2013 | Peters et al. |
| 2013/0337256 A1 | | 12/2013 | Farmer et al. |
| 2013/0337265 A1 | | 12/2013 | Farmer |
| 2014/0034214 A1 | | 2/2014 | Boyer et al. |
| 2014/0061974 A1 | | 3/2014 | Tyler |
| 2014/0159284 A1 | | 6/2014 | Leavitt |
| 2014/0232035 A1 | | 8/2014 | Bheda |
| 2014/0268604 A1 | | 9/2014 | Wicker et al. |
| 2014/0291886 A1 | | 10/2014 | Mark et al. |
| 2015/0136455 A1 | | 5/2015 | Fleming |
| 2016/0012935 A1 | | 1/2016 | Rothfuss |
| 2016/0031155 A1 | | 2/2016 | Tyler |
| 2016/0046082 A1 | | 2/2016 | Fuerstenberg |
| 2016/0052208 A1 | | 2/2016 | Debora et al. |
| 2016/0082641 A1 | | 3/2016 | Bogucki et al. |
| 2016/0082659 A1 | | 3/2016 | Hickman et al. |
| 2016/0107379 A1 | | 4/2016 | Mark et al. |
| 2016/0114532 A1 | | 4/2016 | Schirtzinger et al. |
| 2016/0136885 A1 | | 5/2016 | Nielsen-Cole et al. |
| 2016/0144565 A1 | | 5/2016 | Mark et al. |
| 2016/0144566 A1 | | 5/2016 | Mark et al. |

(56) References Cited

U.S. PATENT DOCUMENTS

| | | |
|---|---|---|
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2008147754 A1 | 12/2008 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

(56) References Cited

OTHER PUBLICATIONS

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).
International Search Report dated Mar. 26, 2018 for PCT/US2017/059778 to CC3D LLC Filed Feb. 11, 2017.

* cited by examiner

COMPOSITE VEHICLE BODY

RELATED APPLICATIONS

This application is based on and claims the benefit of priority from U.S. Provisional Application No. 62/417,056 that was filed on Nov. 3, 2016, the contents of which are expressly incorporated herein by reference.

TECHNICAL FIELD

The present disclosure relates generally to a vehicle body and, more particularly, to a vehicle body made from a composite material.

BACKGROUND

A vehicle body (e.g., an airplane body, a car body, or a boat body) generally includes an internal skeleton that gives shape to the vehicle, and a skin that overlays the skeleton and provides a smooth outer surface. Modern vehicle bodies are fabricated from a combination of different materials, including composites. For example, the skeleton is typically made of wood, aluminum, or stainless steel, while the skin is typically made of a fiber (e.g., a carbon fiber or fiberglass) embedded within a resin matrix.

Pultrusion is a common way to manufacture straight skeletal parts of a vehicle body (e.g., beams, longerons, etc.). During pultrusion manufacturing, individual fiber strands, braids of strands, and/or woven fabrics are pulled from corresponding spools through a resin bath and through a stationary die. The resin is then allowed to cure and harden. Due to the pulling of the fibers prior to curing, some of the fibers may retain a level of tensile stress after curing is complete. This tensile stress can increase a strength of the skeletal part in the direction in which the fibers were pulled.

A vacuum-assisted resin transfer molding (VARTM) process is commonly used to fabricate the skin of the vehicle body, after the internal skeleton has already been formed. In a VARTM process, sheets of fibrous material are manually pulled over the internal skeleton and then tacked in place. The tacked material is then manually coated with a liquid matrix (e.g., a thermoset resin or a heated thermoplastic), covered with a vacuum bag to facilitate impregnation of the liquid matrix, and allowed to cure and harden.

Although pultrusion manufacturing and VARTM can be an acceptable ways to produce vehicle body parts in some situations, they can also be problematic. In particular, the VARTM-produced skin is often attached to the pultruded skeletal parts and/or reinforced via metallic fasteners (e.g., screws, rivets, and clips). The use of metallic fasteners can drive skeletal design and increase a weight and cost of the vehicle body. In addition, the various vehicle body parts may need to be joined to each other via specially designed hardware, which can also be heavy and costly. Further, electronics (e.g., sensors, heaters, electrical leads, etc.) may need to be added to the vehicle bodies after manufacture, which can further increase the weight, cost, and unreliability. Finally, conventional pultrusion and VARTM manufacturing processes may provide little flexibility in the design and/or use of the vehicle body.

The disclosed composite vehicle body is directed to overcoming one or more of the problems set forth above and/or other problems of the prior art.

SUMMARY

In one aspect, the present disclosure is directed to a vehicle body. The vehicle body may have an internal skeleton forming a wing shape and a fuselage shape, and a skin fabricated in-situ over the internal skeleton. The skin may include a matrix material, and a plurality of continuous fibers at least partially coated with the matrix material. The plurality of continuous fibers may extend from the wing shape over the fuselage shape.

In another aspect, the present disclosure is directed to another vehicle body. This vehicle body may include an internal skeleton having at least one of ribs, spars, trusses, stringers, longerons, and bulkheads that together make a fuselage shape and a wing shape. The fuselage shape and the wing shape may be made from a matrix material and a plurality of continuous fibers at least partially coated with the matrix material. The vehicle body may also include a skin fabricated in-situ over the internal skeleton. The plurality of continuous fibers may extend from the internal skeleton into the into the skin.

In another aspect, the present disclosure is directed to another vehicle body. This vehicle body may include an internal skeleton having a matrix material and plurality of continuous fibers at least partially coated with the matrix material. The vehicle body may also have a skin fabricated in-situ over the internal skeleton. The plurality of continuous fibers may include a first plurality of continuous fibers arranged in generally parallel layers, and a second plurality of continuous fibers that extend normal to the generally parallel layers to interlock the generally parallel layers

DETAILED DESCRIPTION

Figure 1:
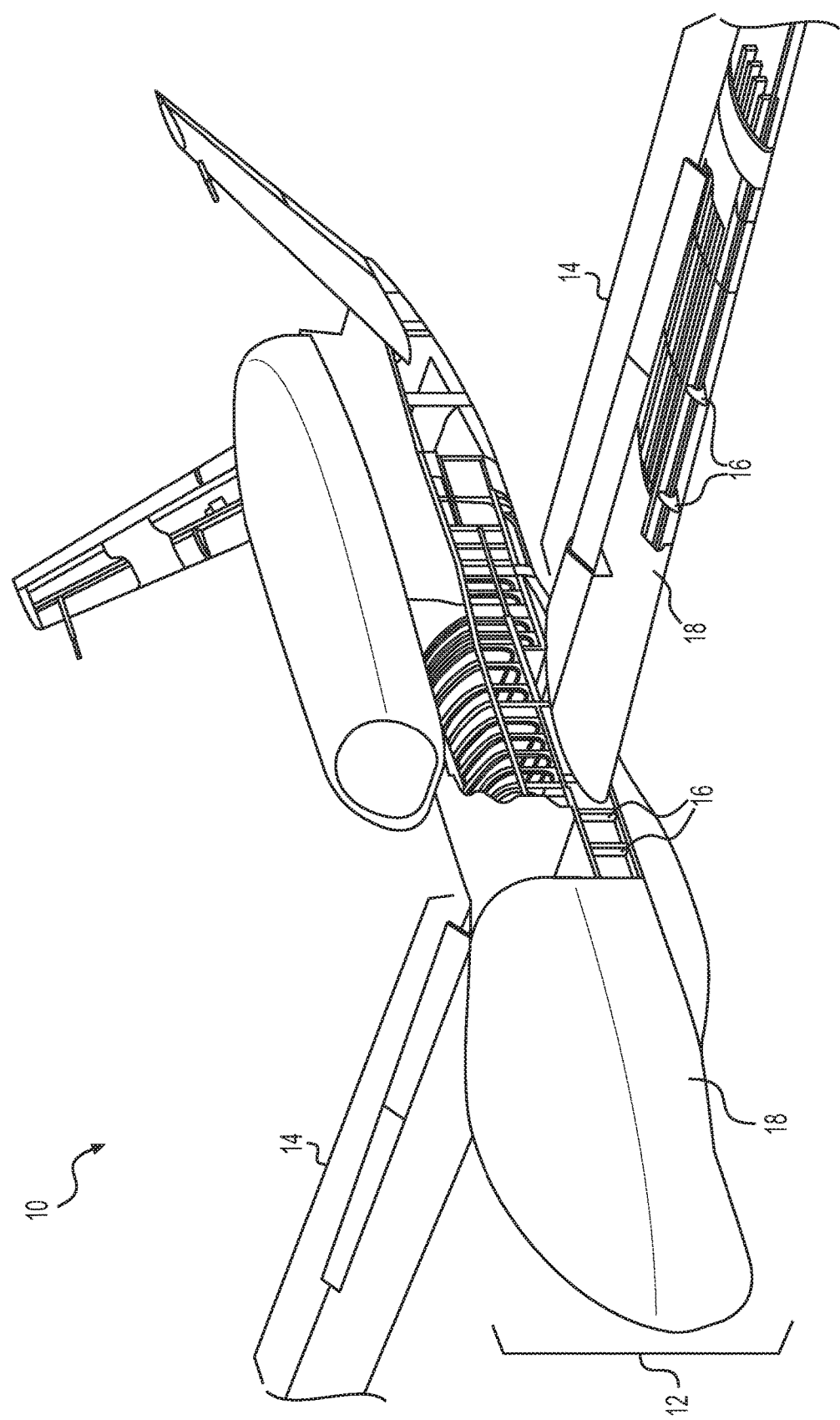
FIG. 1 is a diagrammatic illustration of an exemplary vehicle body.

FIG. 1 illustrates an exemplary vehicle body ("body") 10. In the disclosed embodiment, body 10 is an aircraft body (e.g., an airplane body or a drone body). It is contemplated, however, that body 10 could be of another type (e.g., a car body, a boat body, etc.), if desired. Body 10, regardless of its configuration and intended use, may include one or more components (e.g., a fuselage 12, one or more wings 14, etc.) made from an internal skeleton (e.g., spars, ribs, stringers, bulkheads, trusses, longerons, etc.) 16 covered by an external skin 18. In some embodiments, the components of body 10 may be fabricated separately and subsequently joined together (e.g., via threaded fastening, riveting, etc.). In other embodiments, the body components may be fabricated together as an integral monolithic structure (e.g., a structure that cannot be disassembled without at least some destruction).

Figure 2:
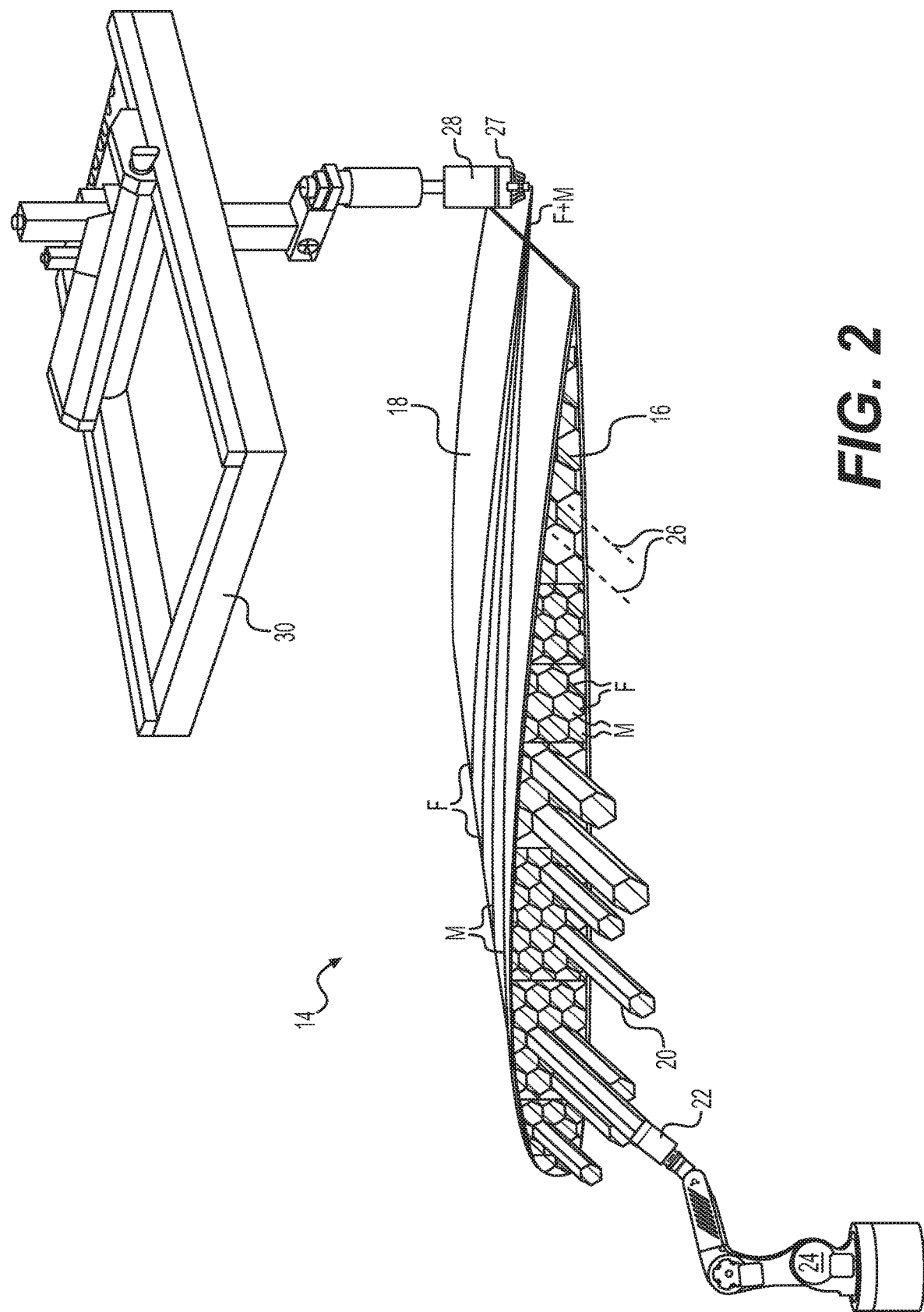
FIG. 2-5 are diagrammatic illustrations of exemplary portions of the vehicle body of FIG. 1 during manufacture.

As shown in FIG. 2, one or more of the components of body 10 may be fabricated via an additive manufacturing process. For example, skeleton 16 may be fabricated from a first additive manufacturing process, while skin 18 may be manufactured from a second and different additive manufacturing process. It is contemplated that both skeleton 16 and skin 18 could be manufactured from the same additive manufacturing process, if desired.

The first additive manufacturing process may be a pultrusion and/or extrusion process that creates hollow tubular structures 20 from a composite material (e.g., a material having a matrix M and at least one continuous fiber F). In particular, one or more heads 22 may be coupled to a support 24 (e.g., to a robotic arm) that is capable of moving head(s) 22 in multiple directions during discharge of structures 20, such that resulting longitudinal axes 26 of structures 20 are three-dimensional. Such a head is disclosed, for example, in U.S. patent application Ser. Nos. 13/975,300 and 15/130,207 and in PCT Application Number 2016042909, all of which are incorporated herein in their entireties by reference.

Head(s) 22 may be configured to receive or otherwise contain the matrix material M. The matrix material M may include any type of liquid resin (e.g., a zero volatile organic compound resin) that is curable. Exemplary resins include epoxy resins, polyester resins, cationic epoxies, acrylated epoxies, urethanes, esters, thermoplastics, photopolymers, polyepoxides, thermoset acrylates, thermosets, bismaleimides, silicon, and more. In one embodiment, the pressure of the matrix material M inside of head(s) 22 may be generated by an external device (e.g., an extruder or another type of pump) that is fluidly connected to head(s) 22 via corresponding conduits (not shown). In another embodiment, however, the pressure may be generated completely inside of head(s) 22 by a similar type of device and/or simply be the result of gravity acting on the matrix material M. In some instances, the matrix material M inside head(s) 22 may need to be kept cool and/or dark in order to inhibit premature curing; while in other instances, the matrix material M may need to be kept warm for the same reason. In either situation, head(s) 22 may be specially configured (e.g., insulated, chilled, and/or warmed) to provide for these needs.

The matrix material M stored inside head(s) 22 may be used to coat any number of continuous fibers F and, together with the fibers F, make up walls of composite structures 20. The fibers F may include single strands, a tow or roving of several strands, or a weave of many strands. The strands may include, for example, carbon fibers, vegetable fibers, wood fibers, mineral fibers, glass fibers, metallic wires, SiC Ceramic fibers, basalt fibers, etc. The fibers F may be coated with the matrix material M while the fibers F are inside head(s) 22, while the fibers F are being passed to head(s) 22, and/or while the fibers F are discharging from head(s) 22, as desired. In some embodiments, a filler material (e.g., chopped fibers) may be mixed with the matrix material M before and/or after the matrix material M coats the fibers F. The matrix material, the dry fibers, fibers already coated with the matrix material M, and/or the filler may be transported into head(s) 22 in any manner apparent to one skilled in the art. The matrix-coated fibers F may then pass over a centralized diverter (not shown) located at a mouth of head(s) 22, where the resin is caused to cure (e.g., from the inside-out, from the outside-in, or both) by way of one or more cure enhancers (e.g., UV lights and/or ultrasonic emitters) 27.

In the example of FIG. 2, structures 20 extend in a length direction of wing 14 and makeup at least a portion of skeleton 16. Each structure 20 may be discharged adjacent another structure 20 and/or overlap a previously discharged structure 20, and subsequently cured such that the liquid resin within neighboring structures 20 bonds together. Any number of structures 20 may be grouped together and have any trajectory required to generate the desired skeletal shape of wing 14.

In some embodiments, a fill material (e.g., an insulator, a conductor, an optic, a surface finish, etc.) could be deposited inside and/or outside of structures 20 while structures 20 are being formed. For example, a hollow shaft (not shown) could extend through a center of and/or over any of the associated head(s) 22. A supply of material (e.g., a liquid supply, a foam supply, a solid supply, a gas supply, etc.) could then be connected with an end of the hollow shaft, and the material forced through the hollow shaft and onto particular surfaces (i.e., interior and/or exterior surfaces) of structure 20. It is contemplated that the same cure enhancer(s) 27 used to cure structure 20 could also be used to cure the fill material, if desired, or that additional dedicated cure enhancer(s) (not shown) could be used for this purpose. The fill materials could allow one or more of structures 20 to function as fuel tanks, fuel passages, electrical conduits, ventilation ducts, etc.

The second additive manufacturing process used to fabricate the exemplary wing 14 of FIG. 2 may also be a pultrusion and/or extrusion process. However, instead of creating hollow tubular structures 20, the second additive manufacturing process may be used to discharge tracks, ribbons, and/or sheets of composite material over tubular structures 20 (and/or over other features of skeleton 16) to thereby fabricate skin 18. In particular, one or more heads 28 may be coupled to a support 30 (e.g., to an overhead gantry) that is capable of moving head(s) 28 in multiple directions during fabrication of skin 18, such that resulting contours of skin 18 are three-dimensional.

Head 28 may be similar to head 22 and configured to receive or otherwise contain a matrix material M (e.g., the same matrix material M contained within head 22). The matrix material M stored inside head(s) 28 may be used to coat any number of separate fibers F, allowing the fibers F to make up centralized reinforcements of the discharging tracks, ribbons, and/or sheets. The fibers F may include single strands, a tow or roving of several strands, or a weave of multiple strands. The strands may include, for example, carbon fibers, vegetable fibers, wood fibers, mineral fibers, glass fibers, metallic wires, etc. The fibers F may be coated with the matrix material M while the fibers F are inside head(s) 28, while the fibers F are being passed to head(s) 28, and/or while the fibers F are discharging from head(s) 28, as desired. The matrix material, the dry fibers, and/or fibers already coated with the matrix material may be transported into head(s) 28 in any manner apparent to one skilled in the art. The matrix-coated fibers F may then pass through one or more circular orifices, rectangular orifices, triangular orifices, or orifices of another curved or polygonal shape, where the fibers F are pressed together and the resin is caused to cure by way of one or more cure enhancers 27.

Figure 3:
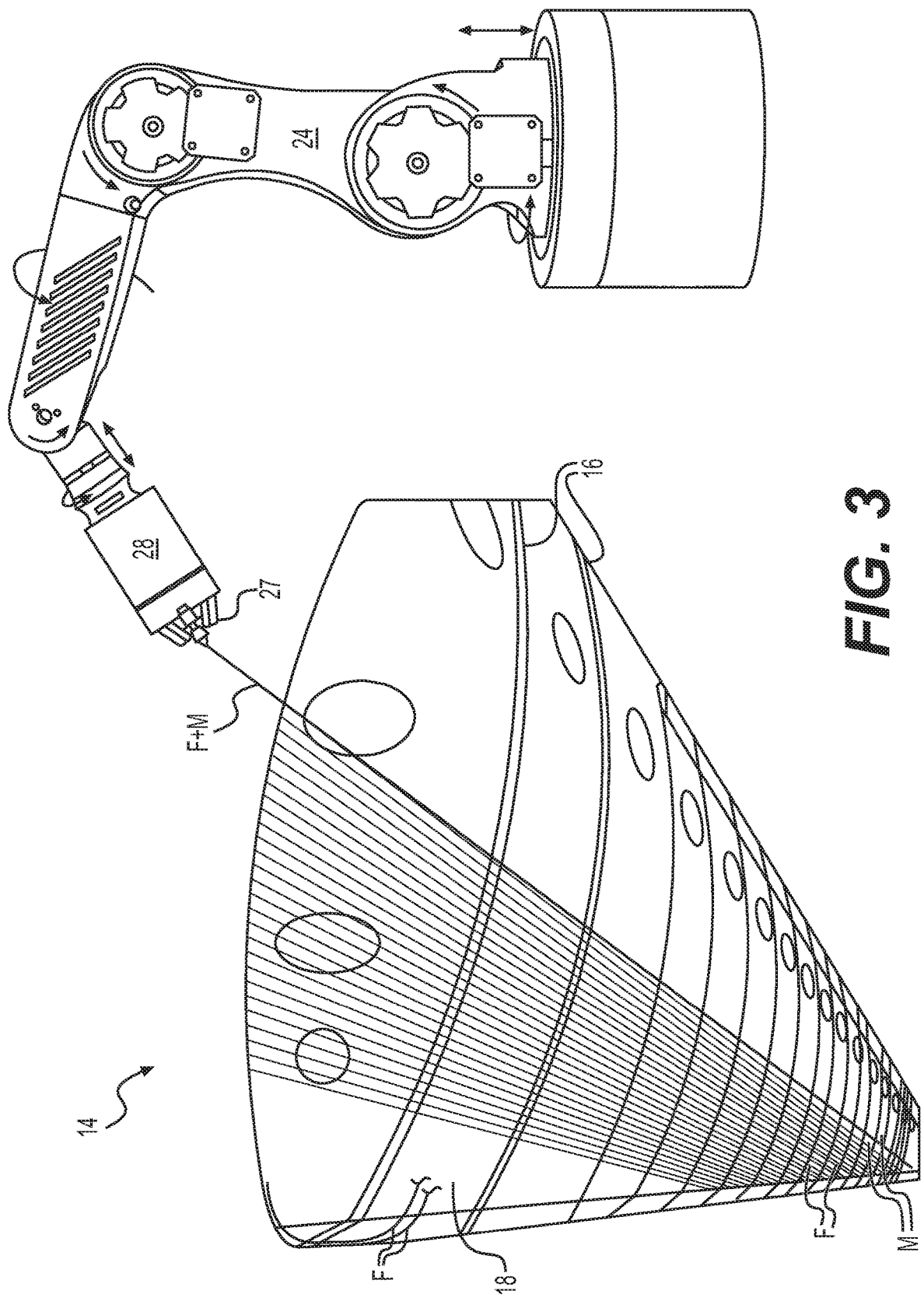

In another exemplary embodiment shown in FIG. 3, only a single additive manufacturing process is being used to fabricate wing 14. In particular, the second manufacturing process described above is being used to additively build up layers of skeleton 16 (e.g., of spars and/or stringers) with continuous fibers F and matrix material M and to cover skeleton 16 with additively built up layers of skin 18 of the same or different continuous fibers F and matrix material M. The fibers F making up skeleton 16 may continue over an outer surface of skeleton 16 to become part of skin 18, such that a continuous mechanical connection is formed between skeleton 16 and skin 18 by the continuous fibers F. In this way, the number of fasteners required to connect skin 18 to skeleton 16 may be reduced (if not eliminated). It is contemplated that support 24 and/or support 30 may be used to move any number of heads 28 during fabrication of wing 14 (or during fabrication of any other component of body 10).

As described above, the first and second additive manufacturing processes can be extrusion or pultrusion processes. For example, extrusion may occur when the liquid resin matrix M and the associated continuous fibers F are pushed from head(s) 22 and/or head(s) 28 during the movement of supports 24 and/or 30. Pultrusion may occur after a length of resin-coated fibers is connected to an anchor (not shown) and cured, followed by movement of head(s) 22 and/or heads(28) away from the anchor. The movement of head(s) 22 and/or head(s) 28 away from the anchor causes the fibers F to be pulled from the respective head(s) along with the coating of the matrix material M.

In some embodiments, pultrusion may be selectively implemented to generate tension in the fibers F that make up skeleton 16 and/or skin 18 and that remains after curing. In particular, as the fibers F are being pulled from the respective head(s), the fibers F may be caused to stretch. This stretching can create tension within the fibers F. As long as the matrix M surrounding the fibers F cures and hardens while the fibers F are stretched, at least some of this tension remains in the fibers F and functions to increase a strength of the resulting composite structure.

Structures fabricated via conventional pultrusion methods may have increased strength in only a single direction (e.g., in the one direction in which fibers were pulled through the corresponding die prior to manual resin impregnation and curing). However, in the disclosed embodiment, the increased strength in the skeleton 16 and/or skin 18 of body 10 (e.g., within wing 14) caused by residual tension within the corresponding fibers F may be realized in the axial direction of each the fibers F. And because each fiber F could be pulled in a different direction when being discharged by head(s) 22 and/or 28, the tension-related strength increase may be realized in multiple (e.g., innumerable) different directions.

Structures fabricated via conventional pultrusion methods may have strength increased to only a single level (e.g., to a level proportionate to an amount in which the fibrous cloth was stretched by the pulling machine prior to manual resin impregnation and curing). However, in the disclosed embodiment, because the matrix M surrounding each fiber F may be cured and harden immediately upon discharge, the force pulling on the fiber F may be continuously varied along the length of the fiber F, such that different segments of the same fiber F are stretched by different amounts. Accordingly, the tensile stress induced within each of the different segments of each fiber F may also be different, resulting in a variable strength within the different segments of skeleton 16 and/or skin 18 of body 10. This may be beneficial in variably loaded areas of body 10 (e.g., at the intersection of wing 14 and fuselage 12, within a center of wing 14, at the leading edge of wing 14, etc.).

Figure 4:
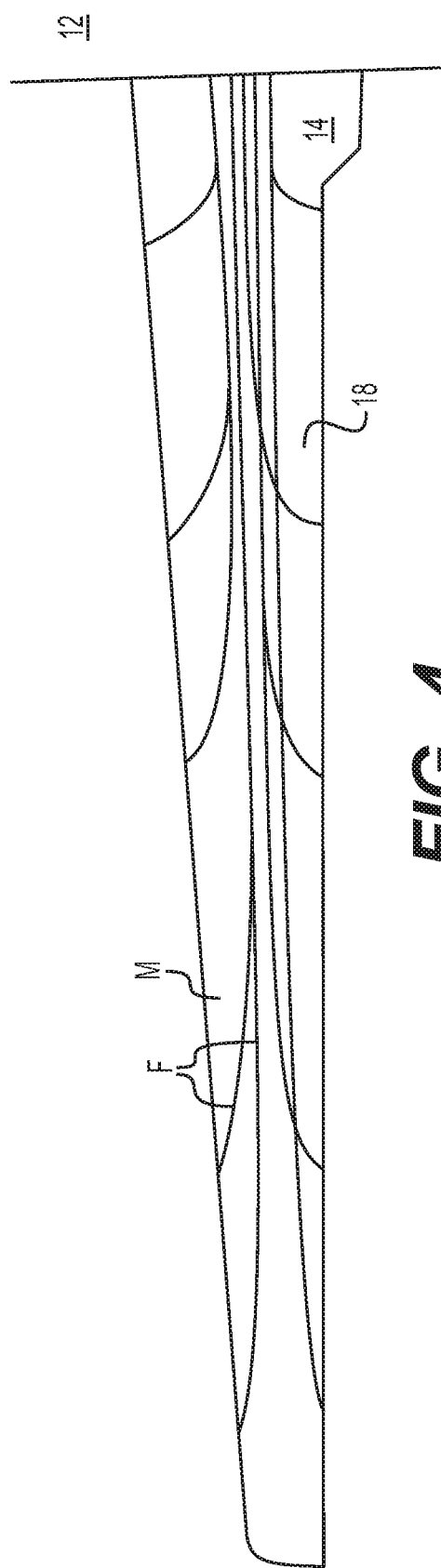

FIG. 4 illustrates an exemplary way in which the fibers F of skin 18 can be arranged to provide for desired characteristics of wing 14. In this example, the fibers F are arranged organically (e.g., in the way that a tree grows or in the way that blood veins are situated in the body). Specifically, the fibers F placed over structure 16 of wing 14 may be anchored at an intersection with fuselage 12 and in a general fore/aft center. The fibers F may then be pulled toward a distal tip of wing 14, and away from the fore/aft center (e.g., toward a leading or trailing edge of wing 14), with different fibers F extending different distances toward the distal tip. In addition, because the discharging matrix material M may cure immediately upon discharge from head 28 and bond to either structure 16 or previously discharged layers of skin 18, movement of head 28 during discharge may be controlled to create trajectories of the fibers F that curve. It is contemplated that the fibers F may pass completely around wing 14 at its distal termination point, and then be pulled back toward fuselage 12 following a mirror image of its initial trajectory. This arrangement of organically arranged fibers may be located at a top side of wing 14, at a lower side, and/or around a cross-sectional perimeter of wing 14 at multiple locations. With this arrangement, a greater density of fibers F may exist near fuselage 12 than near the distal tip of wing 14. Accordingly, wing 14 may be thicker near fuselage 12 and near the general fore/aft center, and taper toward the distal tip and the leading and trailing edges. Other arrangements and/or fiber distribution schemes may be employed, as desired.

Figure 5:
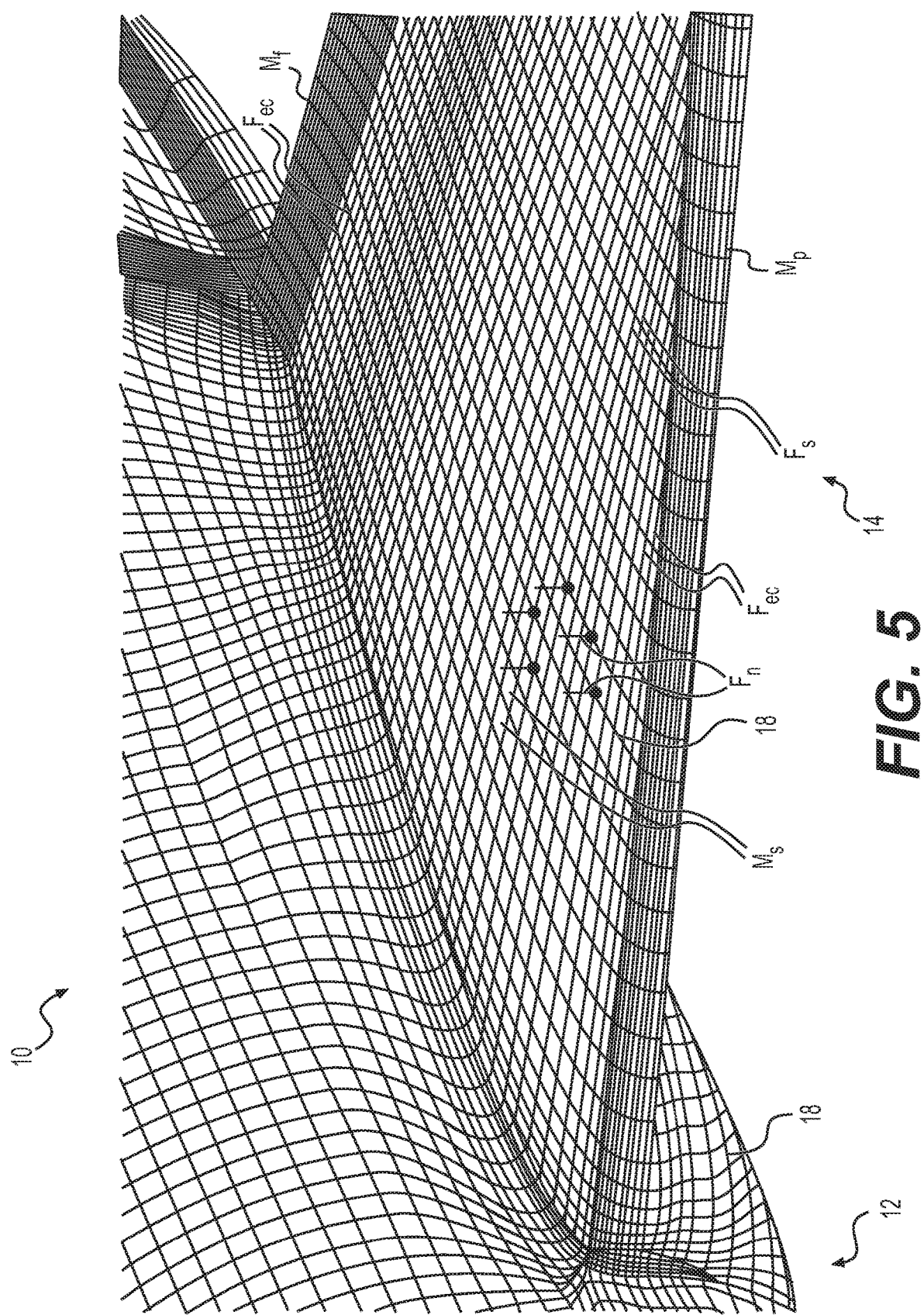
Figure 6:
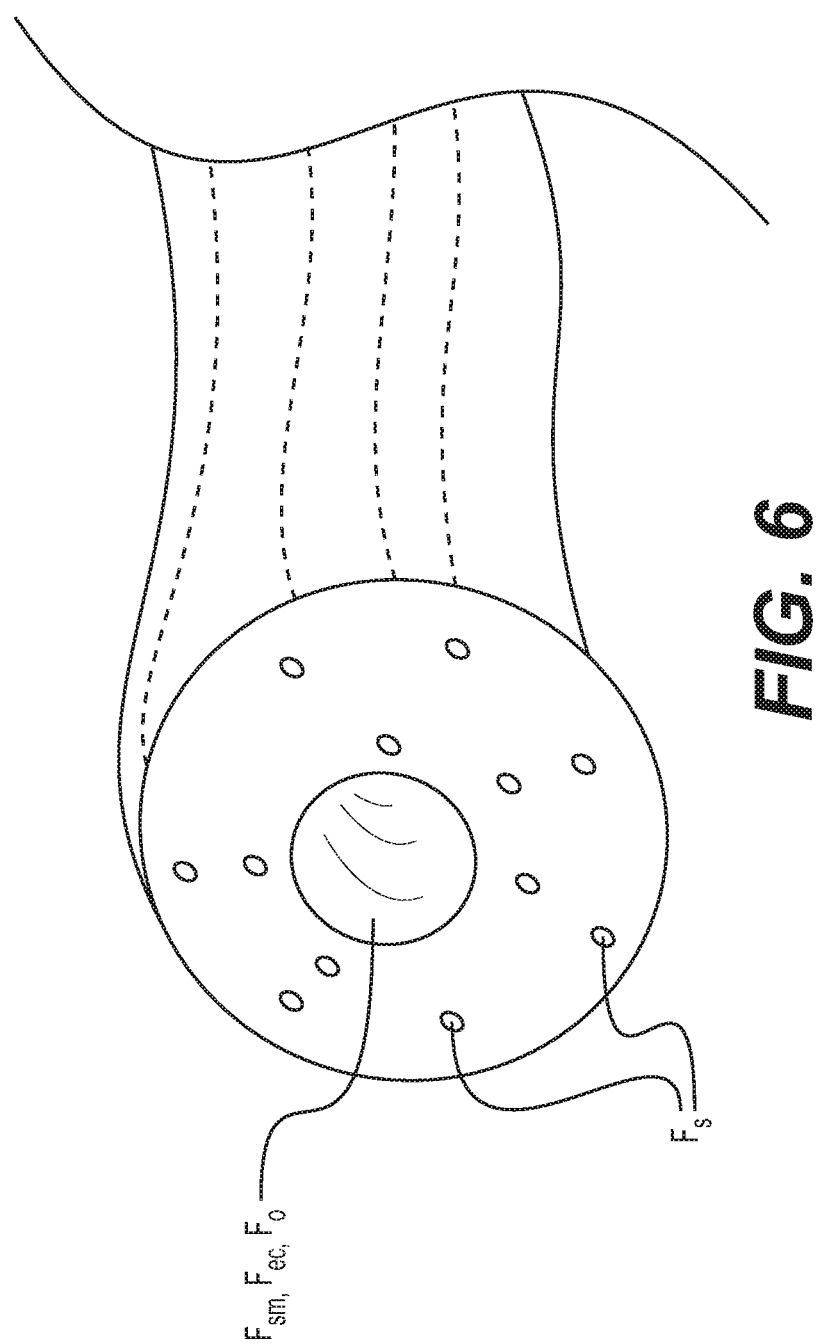
FIG. 6 is a cross-sectional illustration of an exemplary fiber that may be used to fabricate the vehicle body of FIG. 1.

In one exemplary embodiment shown in FIG. 5, some of the fibers F within the composite material making up one or more portions of body 10 have unique characteristics. For example, while a majority of wing 14 may comprise a structural type fiber $F_s$ (e.g., carbon fibers, fiberglass, or Kevlar fibers), some portions of wing 14 may include another type of fiber F (e.g., electrically conductive fibers $F_{ec}$, optical fibers $F_O$, shape memory fibers $F_{sm}$, etc.). The other type of fibers F may be selectively interwoven with the structural type fibers $F_s$ at strategic locations. For example, electrically conductive fibers $F_{ec}$ may be located at leading edges and/or thinner portions of wing 14 and used as heating electrodes that can be connected to a power source and used to remove ice from wing 14. Alternative, electrically conductive fibers $F_{ec}$ may be located at high-stress regions (e.g., at the intersection of wing 14 and fuselage 12) and used as strain gauges to detect loading of body 10. In a similar manner optical fibers $F_O$ may be located at high-stress regions and an energy beam passed therethrough. As body 10 flexes, the optical fibers $F_O$ may be squeezed and/or closed, thereby generating an optical feedback signal indicative of the flexing. In yet another embodiment, fibers $F_{sm}$ fabricated from a shape memory alloy (e.g., Nitonol) may be interwoven with the structural type fibers $F_s$ and selectively energized (e.g., via electricity or heat) to cause flexing (e.g., controlled pulling and/or pushing) of body 10 that results in a desired aerodynamic performance (e.g., steering, orientation, elevation control, stability, drag, etc.). As shown in FIG. 6, it is contemplated that the electrically conductive fibers $F_{ec}$, the optical fibers $F_O$, and/or the shape memory fibers $F_{sm}$ may be coated with another material (e.g., insulation, a strength enhancing layer, etc.), if desired. It is also contemplated that other electrical components (e.g., resistors, capacitors, etc.) may be extruded through heads 22, 28 and/or automatically picked-and-placed (e.g., via attachments associated with heads 22 and/or 28) during discharge of fibers $F_{ec}$, fibers $F_O$, and/or fibers $F_{sm}$. Operation of these components and/or of fibers $F_{ec}$, fibers $F_O$, and/or fibers $F_{sm}$ may be selectively tuned in these instances, for example by adjusting a shape, tension, and/or size of the fibers.

Structures fabricated via conventional pultrusion and/or extrusion methods may be limited in the orientation of the associated fibers. That is, the fibers may be generally overlapping and lie in parallel layers. However, in the embodiment illustrated in FIG. 5, because the matrix M surrounding each fiber F may be cured and harden immediately upon discharge, the fibers F may be caused to extend into free space without additional support. That is, the fibers F may not be required to lie in flat layers on top of each other. Accordingly, the fibers F making up skeleton 16 and/or skin 18 may be oriented in directions that are perpendicular to each other in three dimensions. For example, FIG. 5 illustrates fibers $F_n$ that extend in a direction normal to the surface of wing 14. This may allow for interlocking of fiber layers and/or for the creation of unique (e.g., turbulence enhancing) surface textures.

As described above and shown in FIG. 5, body 10 may be fabricated as an integral monolithic structure, in some embodiments. For example, wings 14 may be fabricated together with (e.g., at the same time as and without separation from) fuselage 12. In particular, as support(s) 24 and/or 30 move any number of head(s) 28 over skeleton 16 to create skin 18 (referring to FIG. 2), head(s) 28 may pass from one wing 14, over or under fuselage 12, and continue across the opposing wing 14. In this instance, the fibers F discharging from head(s) 28 may be continuous over wings 14 and fuselage 12. This process may be repeated any number of times, such that millions (if not hundreds of millions) of fibers F extend through the intersection between wings 14 and fuselage 12, thereby creating a strong mechanical connection without requiring the use of specialized hardware and/or heavy fasteners.

In the exemplary embodiment shown in FIG. 5, the matrix M within the composite material making up one or more portions of body 10 has unique characteristics. For example, while a majority of wing 14 may comprise a structural type matrix $M_s$ (e.g., a conventional UV curable liquid resin such as an acrylated epoxy), some portions of wing 14 may include another type of matrix M (e.g., a pyrolized matrix $M_p$, a matrix that remains somewhat flexible $M_f$, etc.). The other type of matrix M may be selectively used to coat the fibers F at strategic locations. For example, the pyrolized matrix $M_p$ may be fed into head 28 as head 28 nears the leading edge of wing 14 and/or a nose of fuselage 12, such that the resulting composite material may function as a heat shield in these areas. In another example, the flexible matrix $M_f$ may be fed into head 28 as head 28 nears the trailing edge of wing 14 (e.g., where the shape memory fibers $F_{sm}$ are placed, such that the resulting composite material may be more flexible and selectively warped or twisted to provide for the desired aerodynamic properties described above.

Figure 7:
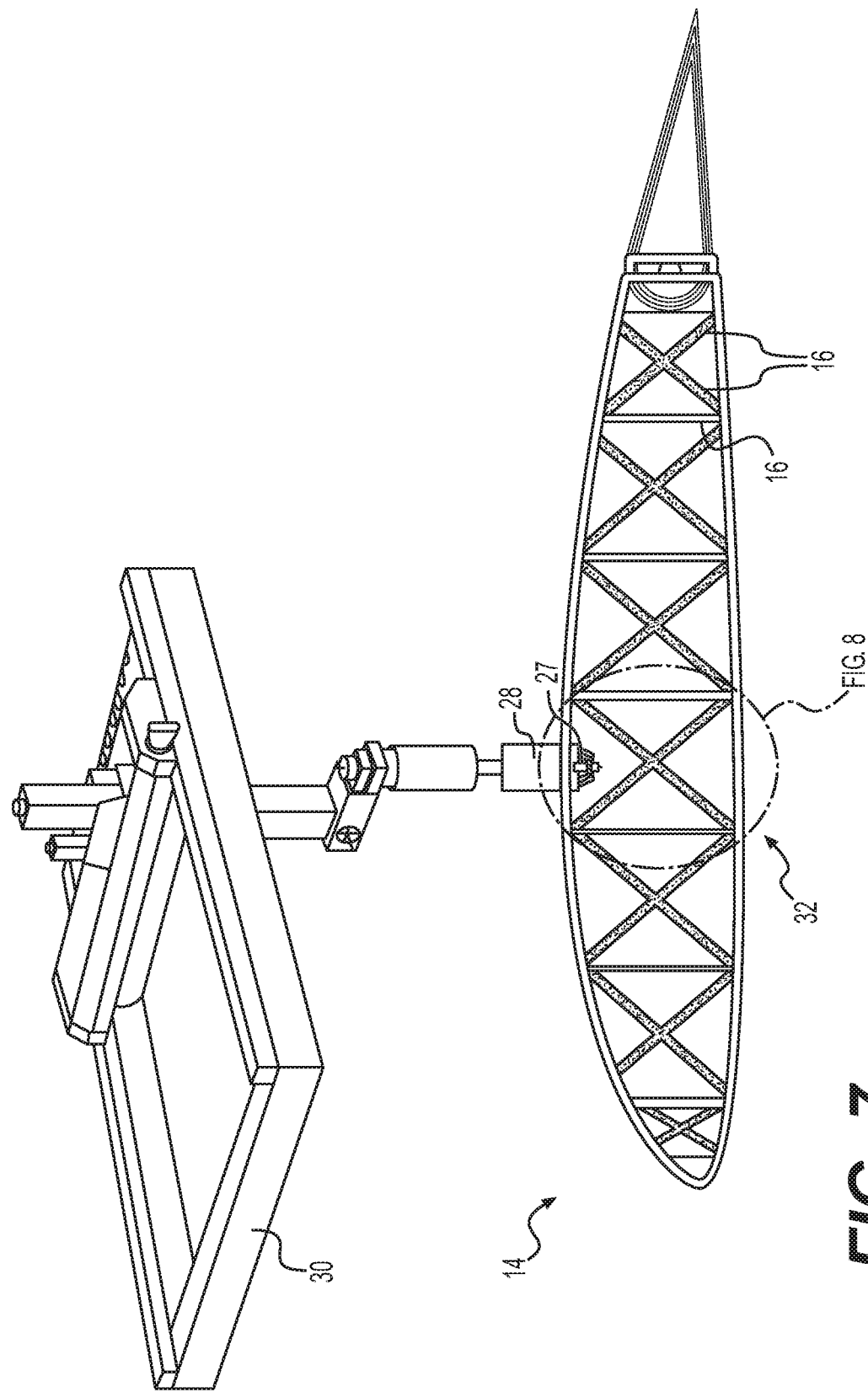
FIGS. 7 and 8 are diagrammatic illustrations of additional exemplary portions of the vehicle body of FIG. 1.

FIG. 7 illustrates an exemplary part 32 of skeleton 16 that may be fabricated through the use of head 28 and support 30. Although depicted and described as a rib of wing 14, part 32 could be another skeletal component of wing 14 and/or fuselage 12. In this example, part 32 includes opposing outer support surfaces 34, opposing internal braces 36, and a plurality of cross-pieces 38 that interconnect support surfaces 34 and/or braces 36. It should be noted that outer support surfaces 34 and/or internal braces 36 could have any desired shape, for example curved, flat, stepped, etc. It is also contemplated that outer support surfaces 34 and internal support surfaces 36 could form one or more continuous surfaces, if desired. For example, one or more of support surfaces 34 could be curved and generally tangential with one or more of braces 36 (e.g., at a leading and/or trailing end of the rib). And although cross-pieces 38 are shown as generally straight and oriented at about 45° relative to support surfaces 34 and braces 36, it is contemplated that cross-pieces 38 could also be curved and/or oriented at another angle. It should be noted that, although seven adjacent and nearly identical parts 32 are shown to make up the disclosed rib, any number of the same or different parts 32 (e.g., only one part 32) may be used for this purpose.

Figure 8:
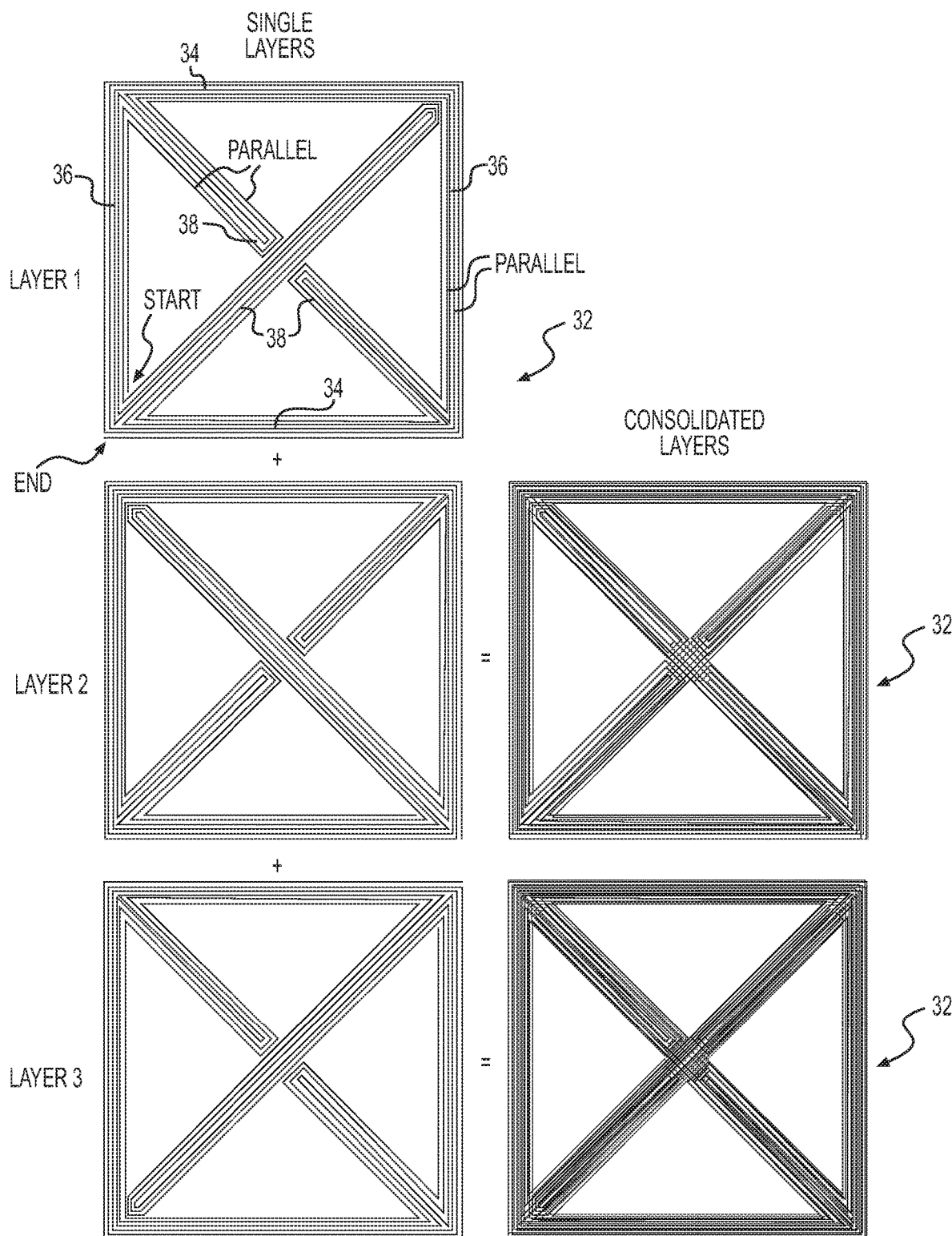

Part 32 may be created following a unique tool path that allows for use of continuous fibers and provides for high-strength in a low-weight configuration. In particular, part 32 may be fabricated using a middle-out strategy. FIG. 8 illustrates use of this strategy during fabrication using multiple different and overlapping layers.

For example, in a first layer, head 28 may be controlled to start discharging and curing one or more continuous resin-coated fibers at a lower-left corner (e.g., adjacent an internal intersection of a lower support surface 34 and a left brace 36), and continue discharging and curing the same resin-coated fiber(s) during travel upward to an adjacent upper-left corner. Head 28 may then move diagonally inward toward a general center of part 32, and then double back prior to reaching the center to move toward the upper-left corner following a generally parallel trajectory. During this doubling-back maneuver, head 28 may be spaced apart a distance from its original trajectory (e.g., spaced more toward the right of part 32), such that an empty space will exist along a diagonal of part 32 and a box shape is formed at internal ends of the diagonal parallel tracks. Head 28 may then move rightward to an upper-right corner of part 32, followed by about a 90° turn downward upon reaching an internal edge of part 32. The same general pattern may be repeated at the lower-right corner of part 32 that was made at the upper-left corner, such that a mirror image across a virtual diagonal dividing line is created. Head 28 may then move leftward and stop short of its starting point, after which head 28 may turn through about 45° clockwise and travel diagonally completely across part 32 to the upper-right corner. Head 28 may then double back toward the lower-left corner along a spaced-apart parallel track, such that head 28 is near its starting point (e.g., radially outward and slightly lower than the starting point). During this doubling-back maneuver, head 28 may be spaced apart a distance from its original trajectory (e.g., spaced more toward the left of part 32), such that an empty space will exist along a diagonal of part 32. As head 28 moves towards the upper-right corner, it may deviate from its trajectory at a turn-around point and head into the corner, such that an arrow-head shape is formed at internal ends of the parallel tracks. The arrow-head shape may bond to the hardened fibers laid down previously at this corner location. The diagonally laid fiber(s) may bond to the box shape previously laid down at the center of part 32. The entire process may be repeated any number of times to add a corresponding number of material tracks to the first layer and thereby increase a cross-sectional area of the first layer. During repetition, part 32 may grow outward and the empty spaces described above as being located between the parallel tracks may be filled in. It should be noted that, during formation of any one layer, the fibers discharging from head 28 may not overlap other fibers such that all fibers are laid down within the same plane. When head 28 reaches an endpoint of a particular layer, the fiber(s) may be cut from head 28, such that head 28 may be repositioned for start of a new layer.

A second layer may be formed directly on top of the first layer, for example by rotating the pattern of the first layer through a desired angle (e.g., through about 90°). By rotating the pattern through about 90°, the fibers extending diagonally completely across part 32 in the second layer may overlap the fibers that doubled back at the center of part 32 in the first layer. This overlapping of different portions of the repeating pattern may help to increase a strength of part 32. It is contemplated that any number of fibers may be deposited at any location and oriented generally normal to the overlapping layers (e.g., fibers $F_n$ like those shown in FIG. 5) to interlock the layers, if desired. Additionally or alternatively, discharged but uncured portions of a previous layer could be wrapped over subsequently formed layers and then cured to improve an interlock strength.

Any number of additional layers may be formed on top of the first two layers in alternating orientations and/or in orientations of incremental rotating angles (e.g., when the angle is not a multiple of 90°). This may continue until a desired thickness of part 32 is achieved. In one example, an entire fuselage 12 and/or wing 14 could be fabricated in this manner. For example, skin 18 could be simultaneously fabricated over part 32 when using the middle-out approach. In particular, an empty space may be created inside of fuselage 12 and/or wing 14 and between adjacent parts 32, by only creating outer portions of supports 34 and/or braces 36.

INDUSTRIAL APPLICABILITY

The disclosed arrangements and designs of skeleton 16 and skin 18 may be used in connection with any type of vehicle body 10. For example, skeleton 16 and skin 18 may be used in connection with an airplane body, a drone body, a car body, a boat body, or any other type of vehicle body where light-weight, low-cost, and high-performance are important. Vehicle body 10 may be light-weight and low-cost due to the reduction in the number of fasteners required to secure skin 18 to skeleton 16 and/or to secure components of vehicle body 10 to each other. In addition, vehicle body 10 may be light-weight do to the use of composite materials used to make both of skeleton 16 and skin 18. The high-performance may be provided in the unique ways that particular fibers and resins are used and laid out within skeleton 16 and skin 18.

It will be apparent to those skilled in the art that various modifications and variations can be made to the disclosed vehicle body. Other embodiments will be apparent to those skilled in the art from consideration of the specification and practice of the disclosed vehicle body. It is intended that the specification and examples be considered as exemplary only, with a true scope being indicated by the following claims and their equivalents.

What is claimed is:

1. A vehicle body, comprising:
   an internal skeleton forming a wing shape and a fuselage shape; and
   a skin fabricated in-situ over the internal skeleton and including:
   a matrix material; and
   plurality of continuous fibers at least partially coated with the matrix material, the plurality of continuous fibers extending from the wing shape over the fuselage shape,
   wherein:
   the plurality of continuous fibers includes:
   a first plurality of continuous fibers arranged into a first layer that is generally parallel to an outer surface of the vehicle body; and
   a second plurality of continuous fibers arranged into a second layer overlapping the first layer; and
   the first plurality of continuous fibers extend normal to the outer surface from the first layer into the second layer to interlock the first and second layers.

2. The vehicle body of claim 1, wherein:
   the wing shape is a first wing shape;
   the internal skeleton further forms a second wing shape; and
   the plurality of continuous fibers in the skin on the first wing shape extend over the fuselage shape and into the skin on the second wing shape.

3. The vehicle body of claim 1, wherein:
   the internal skeleton includes at least one of ribs, spars, trusses, stringers, longerons, and bulkheads fabricated from the matrix material and a plurality of continuous fibers encased in the matrix material; and
   at least some of the plurality of continuous fibers of the at least one of ribs, spars, trusses, stringers, longerons, and bulkheads extend into and form a portion of the skin.

4. The vehicle body of claim 1, wherein the second plurality of continuous fibers pass orthogonally between adjacent fibers of the second plurality of continuous fibers.

5. The vehicle body of claim 1, wherein a density of the plurality of continuous fibers varies along a length of the wing shape.

6. The vehicle body of claim 1, wherein the matrix material includes multiple resins deposited at strategic locations in the skin.

7. The vehicle body of claim 6, wherein the multiple resins includes:
   a flexible resin at a trailing edge of the wing shape; and
   a stiffer resin away from the trailing edge.

8. The vehicle body of claim 6, wherein the multiple resins includes:
   a pyrolized resin at a leading edge of the wing shape; and
   an acrylated resin away from the leading edge.

9. A vehicle body, comprising:
   an internal skeleton having at least one of ribs, spars, trusses, stringers, longerons, and bulkheads that together make a fuselage shape and a wing shape from a matrix material and a plurality of continuous fibers at least partially coated with the matrix material; and
   a skin fabricated in-situ over the internal skeleton,
   wherein the plurality of continuous fibers extends from the internal skeleton into the skin.

10. The vehicle body of claim 9, wherein the plurality of continuous fibers includes:
    a first plurality of continuous fibers arranged in generally parallel layers; and
    a second plurality of continuous fibers that extend normal to the generally parallel layers to interlock the generally parallel layers.

11. The vehicle body of claim 10, wherein the second plurality of continuous fibers pass orthogonally between adjacent fibers of the second plurality of continuous fibers.

12. The vehicle body of claim 9, wherein a density of the plurality of continuous fibers varies along a length of the wing shape.

13. The vehicle body of claim 9, wherein the matrix material includes multiple resins deposited at strategic locations in the skin.

14. The vehicle body of claim 13, wherein the multiple resins includes:
    a flexible resin at a trailing edge of the wing shape; and
    a stiffer resin away from the trailing edge.

15. The vehicle body of claim 13, wherein the multiple resins includes:
    a pyrolized resin at a leading edge of the wing shape; and
    an acrylated resin away from the leading edge.

16. A vehicle body, comprising:
    an internal skeleton including matrix material and plurality of continuous fibers at least partially coated with the matrix material; and
    a skin fabricated in-situ over the internal skeleton, wherein:
    the plurality of continuous fibers includes:
    a first plurality of continuous fibers arranged into a first layer that is generally parallel to an outer surface of the vehicle body; and a second plurality of continuous fibers arranged into a second layer overlapping the first layer; and the first plurality of continuous fibers extend normal to the outer surface from the first layer into the second layer to interlock the first and second layers.

17. The vehicle body of claim 16, wherein the second plurality of continuous fibers pass orthogonally between adjacent fibers of the second plurality of continuous fibers.

18. The vehicle body of claim 16, wherein a density of the plurality of continuous fibers varies along a length of the skin.

19. The vehicle body of claim 16, wherein the matrix material includes multiple resins deposited at strategic locations in the skin.

\* \* \* \* \*